United States Patent
Shun et al.

(10) Patent No.: US 8,750,472 B2
(45) Date of Patent: Jun. 10, 2014

(54) INTERACTIVE ATTENTION MONITORING IN ONLINE CONFERENCE SESSIONS

(75) Inventors: Wang Shun, Anhui (CN); Li Hua, Anhui (CN); Zhou Ziyu, Anhui (CN); Wang Lianghui, Anhui (CN)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 13/435,185

(22) Filed: Mar. 30, 2012

(65) Prior Publication Data

US 2013/0258042 A1    Oct. 3, 2013

(51) Int. Cl.
*H04M 11/00*    (2006.01)

(52) U.S. Cl.
USPC .................................... 379/93.21; 348/14.08

(58) Field of Classification Search
USPC ............... 379/93.21, 158, 202.01; 348/14.01, 348/14.08
See application file for complete search history.

(56) References Cited

U.S. PATENT DOCUMENTS

| 7,003,550 | B1 | 2/2006 | Cleasby et al. |
| 7,299,403 | B1 | 11/2007 | Cleasby et al. |
| 2007/0005752 | A1* | 1/2007 | Chawla et al. ................. 709/224 |
| 2008/0320082 | A1* | 12/2008 | Kuhlke et al. .................. 709/205 |
| 2011/0113348 | A1 | 5/2011 | Twiss et al. |
| 2013/0124623 | A1* | 5/2013 | Munter .......................... 709/204 |

OTHER PUBLICATIONS

Faronics Corporation, "Faronics Insight, Classroom Management Software," 1999-2012.
Faronics Corporation, "Faronics Insight User Guide," Aug. 2011.
Faronics Corporation, "Faronics Insight, Product Data Sheet," 1999-2011.

* cited by examiner

*Primary Examiner* — Olisa Anwah
(74) *Attorney, Agent, or Firm* — Edell, Shapiro & Finnan, LLC (57) ABSTRACT

In an online conference session involving a presenter at an endpoint device and a plurality of attendees at respective endpoint devices, screenshots of content displayed at the endpoint device of the presenter and content displayed at the endpoint devices of each of the attendees are captured on a periodic basis. First data is stored that represents screenshots of content displayed at the endpoint device of the presenter and of content displayed at the endpoint devices of each of the attendees for each screenshot capture instance. Second data is stored that represents captured screenshots at each of a plurality of screenshot capture instances at the endpoint device for each attendee during the conference session. An attention metric is generated for one or more attendees based on the first data and second data.

28 Claims, 10 Drawing Sheets

| PROCESS | RUN TIME | APPLICATIONS |
|---|---|---|
| FIREFOX.EXE | 2012/01/04 10:00 | ONLINE CONFERENCE APPLICATION |
| OUTLOOK.EXE | 2012/01/04 10:01 | ONLINE TRAINING SESSION |
| NOTEPAD++.EXE | 2012/01/04 10:01 | JAVA - TESTDEMO |
| ... | ... | ... |

FIG.11

INTERACTIVE ATTENTION MONITORING IN ONLINE CONFERENCE SESSIONS

TECHNICAL FIELD

The present disclosure relates to online (e.g., web-based) conference systems.

BACKGROUND

Online conference systems allow meetings to be conducted among multiple participants at multiple remote locations. Examples of such online conference systems are web-based conference systems in which multiple endpoints connect to a conference server and the conference server manages the sharing of audio, video and other data, such as shared documents and other content during a meeting. There are numerous applications for online conference systems, including a training session during which a presenter at one endpoint device is presenting content to a plurality of attendees (e.g., students). Current online conference systems do not provide an interactive and visible solution to track an attention ratio or metric for each attendee in an online conference session.

DESCRIPTION OF EXAMPLE EMBODIMENTS

Overview

In an online conference session involving a presenter at an endpoint device and a plurality of attendees at respective endpoint devices, screenshots of content displayed at the endpoint device of the presenter and content displayed at the endpoint devices of each of the attendees are captured on a periodic basis. First data is stored that represents screenshots of content displayed at the endpoint device of the presenter and of content displayed at the endpoint devices of each of the attendees for each screenshot capture instance. For a given screenshot capture instance, a first compare operation is performed between content displayed at the endpoint device of the presenter and content displayed at the endpoint devices of each of the attendees. Second data is stored that represents captured screenshots at each of a plurality of screenshot capture instances at the endpoint device for each attendee during the conference session. For each attendee, a second compare operation is performed between content displayed at each of the plurality of screenshot capture instances and content displayed at the endpoint device of the presenter. An attention metric is generated for one or more attendees based on the first and second compare operations.

Example Embodiments

Figure 1:
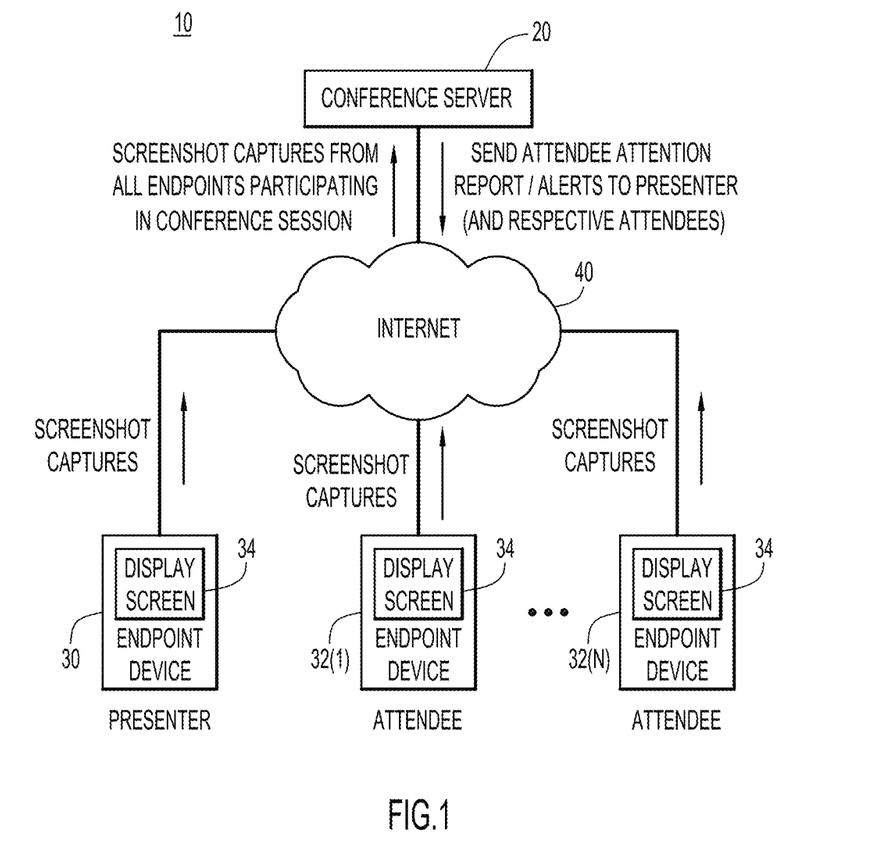
FIG. 1 is a block diagram of an online conference system including a conference server and a plurality of endpoint devices, wherein the conference server is configured to perform attendee attention analysis based on screenshot captures at the endpoint devices.

Referring first to FIG. 1, a diagram is shown of an online (web-based) conference system shown generally at reference numeral 10. The system 10 comprises a conference server 20 and a plurality of endpoint devices (simply called endpoints) shown at reference numerals 30 and 32(1)-32(N). One of the endpoints, endpoint 30, is designated as a presenter endpoint because it is an arbitrary endpoint at which a person is making a presentation to people at respective ones of the other endpoints 32(1)-32(N). Thus, endpoints 32(1)-32(N) are referred to as attendee endpoints since the persons at each of these endpoints are, in the example shown in FIG. 1, attending a session being directed or presented by the person at endpoint 30. Each endpoint includes a display screen 34, and in some cases other peripheral devices such as a mouse and keyboard (not shown in FIG. 1 for simplicity). At any given time during a conference session, a person who is an attendee may switch and become a presenter, and likewise a person who is a presenter may become an attendee and be viewing/listening to content presented by another person who is the presenter at that current time.

The conference server 20 communicates with the endpoints 30 and 32(1)-32(N) by way of one or more networks collectively represented by the Internet shown at reference numeral 40. Each person at an endpoint can share audio, video and other content (documents, Internet-based content, images, videos, etc.) with each person at the other endpoints. This is particularly useful in meetings and other sessions in which a person at one of the endpoints is presenting information to people at other endpoints, e.g., in an online training or instruction session. A conference session may also be referred to herein as a "collaboration" session insofar as the participants of a conference session may be collaborating on various ideas by viewing content shared by participants from one or more endpoints.

One challenge in an online conference session is determining how much an attendee is paying attention to the presentation. It would be helpful to a presenter to know whether one or more attendees are not paying attention to his/her presentation, and also to know an attention metric or ratio for any particular attendee. Accordingly, techniques are provided herein in which screenshot captures are made on a periodic (or on-demand) basis from the presenter endpoint and (one or more, e.g., each of) the attendee endpoints during an online conference session. The conference server 20 analyzes the screenshot content at the presenter endpoint 30 and the attendee endpoints 32(1)-32(N) during the conference session to generate attention reports/alerts which can then be sent to the presenter and/or attendees. In addition, views of the screen content on the presenter endpoint and one or more attendee endpoints can be displayed to the presenter and/or attendees during or after the conference session.

Figure 2:
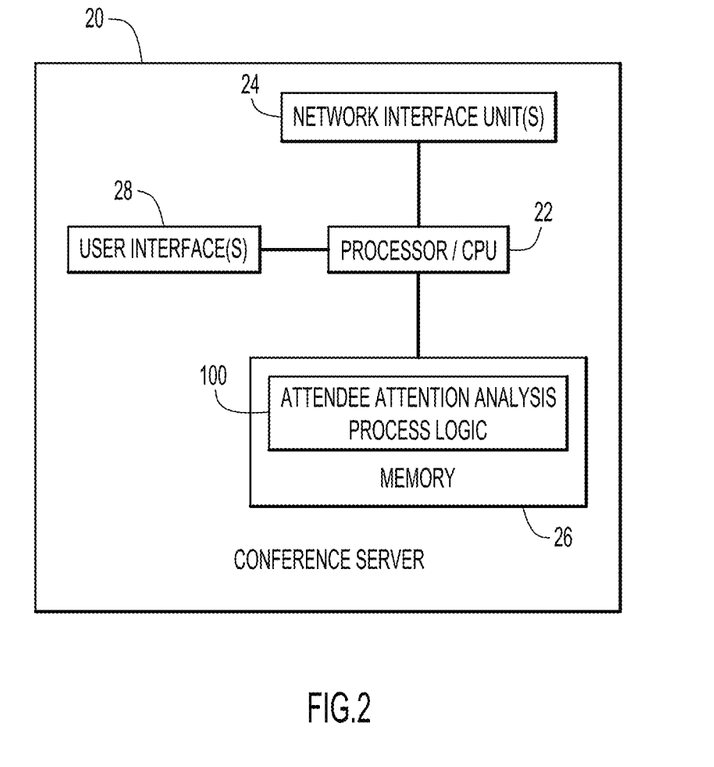
FIG. 2 is a block diagram showing an example of a conference server configured to perform attendee attention analysis based on screenshot captures at the endpoint devices.

Turning now to FIG. 2, an example block diagram is shown of the conference server 20. The conference server 20 may be embodied as a computing device with network connectivity. To this end, the conference server 20 comprises a processor/CPU 22, one or more network interface units 24, memory 26, and one or more user interfaces 28 (e.g., keyboard, display, etc.). The network interface units 24 comprise one or more network interface (e.g., Ethernet) cards to enable network-based communications with the endpoints during a conference session, to receive data from each endpoint and send (combined data) to each of the endpoints.

The memory 26 may comprise read only memory (ROM), random access memory (RAM), magnetic disk storage media devices, optical storage media devices, flash memory devices, electrical, optical, or other physical/tangible memory storage devices. The processor 22 is, for example, a microprocessor or microcontroller that executes instructions stored in memory 26. Thus, in general, the memory 26 may comprise one or more tangible (non-transitory) computer readable storage media (e.g., a memory device) encoded with software comprising computer executable instructions and when the software is executed (by the processor 22) it is operable to perform the operations described herein. For example, the memory 26 stores instructions for attendee attention analysis process logic 100 that, when executed by the processor 22, causes the processor 22 to perform various operations described hereinafter. The memory also stores data associated with screenshots captured from the endpoints and results of the analysis performed by the process logic 100.

Figure 3:
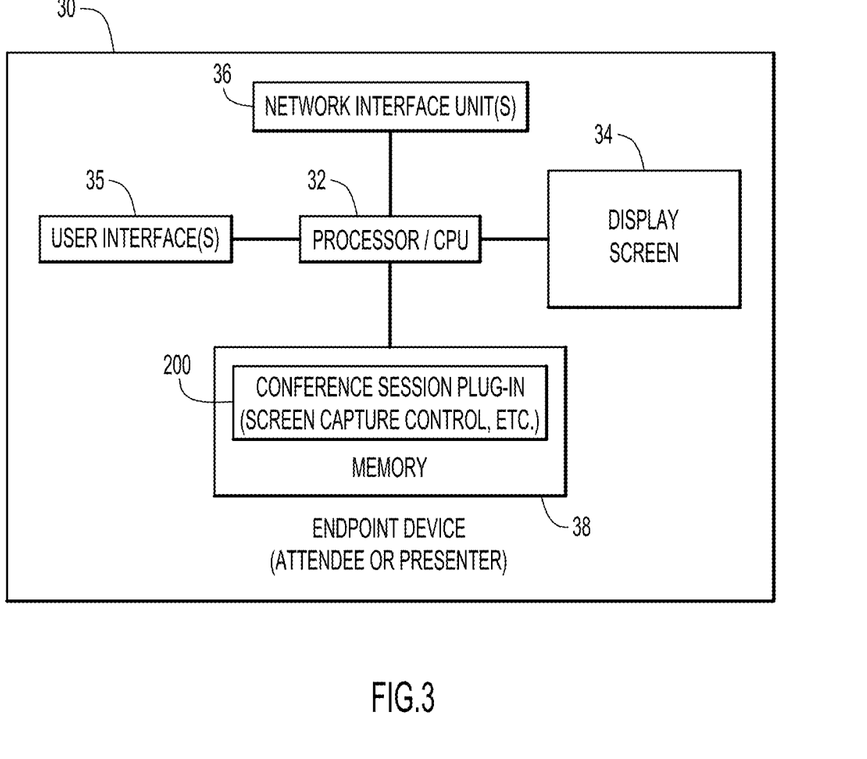
FIG. 3 is a block diagram showing an example of an endpoint device that is enabled to allow an attendee to configure disabling and/or deleting of screenshot captures.

FIG. 3 shows an example block diagram of an endpoint, e.g., the endpoint 30 or any of the endpoints 32(1)-32(N) shown in FIG. 1. The endpoint comprises a processor/CPU 32, display screen 34, user interface(s) 35, one or more network interface unit(s) 36, and memory 38. The network interface unit(s) 36 enable network communications with the conference server 20 for purposes of sending and receiving data during a conference session. The processor 32 executes instructions stored in memory 38 including instructions for a conference session plug-in 200 for presenter and attendee functions (screen capture control, etc.). The user interface(s) 35 may include a keyboard, mouse, microphone, video camera, etc., to allow a user (attendee or presenter) to input commands and data to the endpoint for a conference session. Examples of an endpoint include a desktop computer, laptop computer, tablet computer, Smartphone, etc. The processor 32 executes the software instructions for the conference session plug-in 200 to enable the endpoint to operate as a presenter endpoint or an attendee endpoint depending on the desire of the user of that endpoint. The conference session plug-in 200 may be a web browser plug-in that is installed on the endpoint prior to a conference session or may be a built-in operation of a web browser, or otherwise software that already exists on the endpoint.

Figure 4:
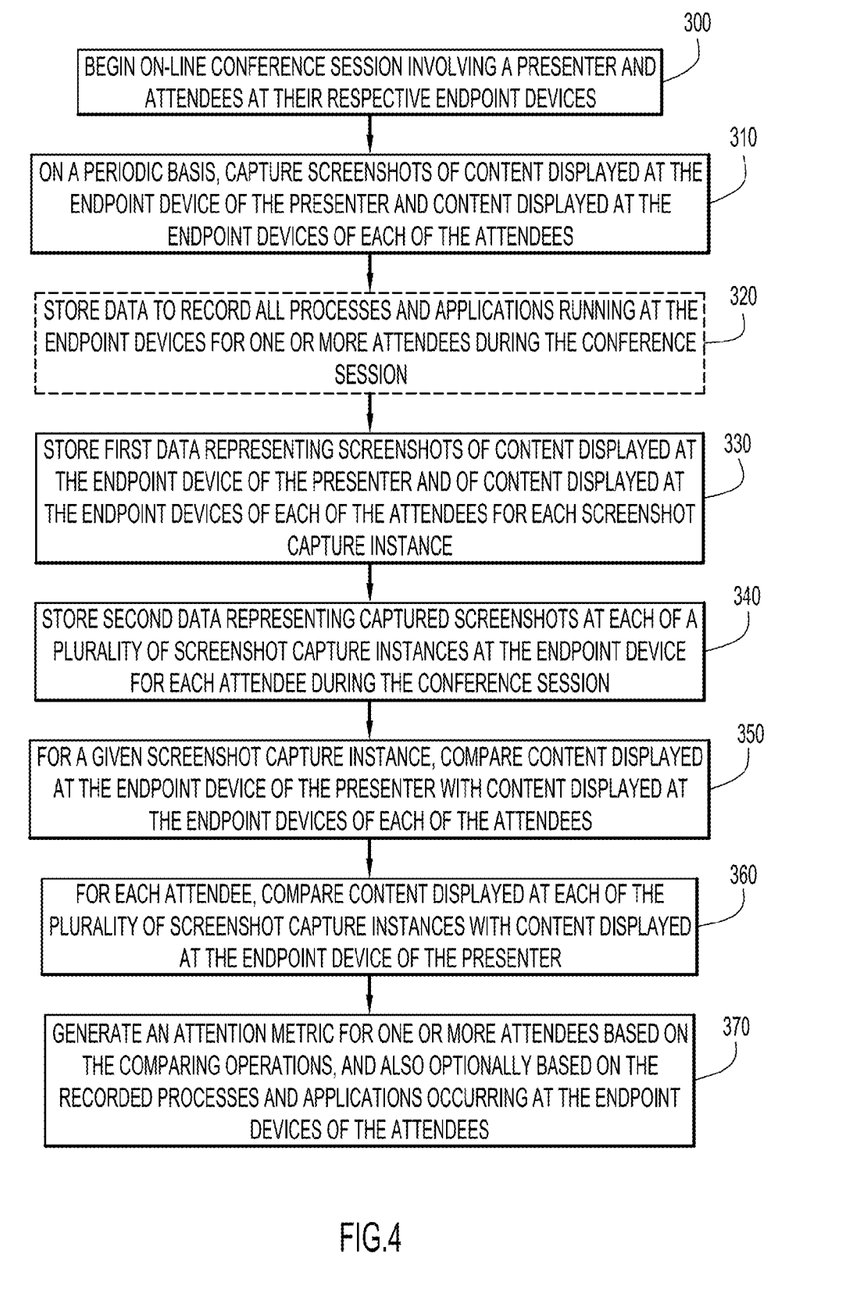
FIG. 4 is an example of a flow chart depicting operations for attendee attention analysis during a conference session.

Reference is now made to FIG. 4 for a description of operations of the conference server 20 and endpoints 30 and 32(1)-32(N) during a conference session in accordance with the attendee attention monitoring techniques. The operations shown in FIG. 4 include operations performed by the attendee attention analysis process logic 100 on the conference server and the conference session plug-in 200 on the endpoints 30 and 32(1)-32(N).

At 300, a conference session involving a plurality of endpoints begins. For example, as shown in FIG. 1, the conference session may involve a presenter at an endpoint 30 and a plurality of attendees at endpoints 32(1)-32(N), respectively. The conference session may involve the presenter at endpoint 30 presenting content (documents, images, video, audio, etc.) to be shared with each of the attendees at endpoints 32(1)-32(N).

At 310, screenshots are captured of content on the display screens of the endpoint of the presenter and of the endpoints of each of the attendees. This involves operations of the conference session plug-in 200 at each endpoint to capture screenshots of content displayed on the display screen at each endpoint and then sending the captured screenshot image data to the conference server 20 for storage and analysis. The screenshot capture operation may be performed on a periodic basis, such as every 5 or 10 minutes for example, under control of a command sent from the conference server 20, or based on pre-configured controls in the conference session plug-in 200. The periodic interval of the screenshot capture is configurable by a presenter or network administrator. In addition, as described further hereinafter, while the screenshot capture operation can occur periodically, the actual instant of time when the screenshot capture is made may be a random instance of time at each periodic screenshot capture event/instance. The random instance of time prevents an attendee from knowing or anticipating a screenshot capture event and intentionally changing his/her displayed content at the precise instant of time when the screenshot capture occurs and thus preventing a true indication of that attendee's attention. As a result, the burden on the network is reduced by avoiding frequent screenshot transfers to the conference server. For example, if the screenshot capture instances are to occur every 10 minutes, then one screenshot capture instance may be at 27 seconds after one 10 minute interval expires, the next screenshot capture instance may be at 10 seconds before the 10 minute interval expires, the next screenshot capture instance may be at 45 seconds after the 10 minute interval expires, and so on.

At 320, an additional capture operation is performed. This capture operation may be optional, and it involves capturing data about the processes and applications running on an endpoint. Again, this operation may involve actions of the conference session plug-in 200 at each endpoint monitoring the task manager status or other process monitor function of the endpoint that indicates which processes or applications are running on the endpoint, and sending that information to the conference server 20. For example, this operation may involve reporting the current top windows title and task name from the respective endpoints and each endpoint sending this information to the conference server. The conference server 20 stores data to record all processes and applications running at the endpoints for one or more attendees during the conference session. The operation 320 of capturing data representing the processes and applications running on the attendee endpoints may be performed on a configurable periodic basis, e.g., every minute, every 3 minutes, etc., for example.

Figure 9:
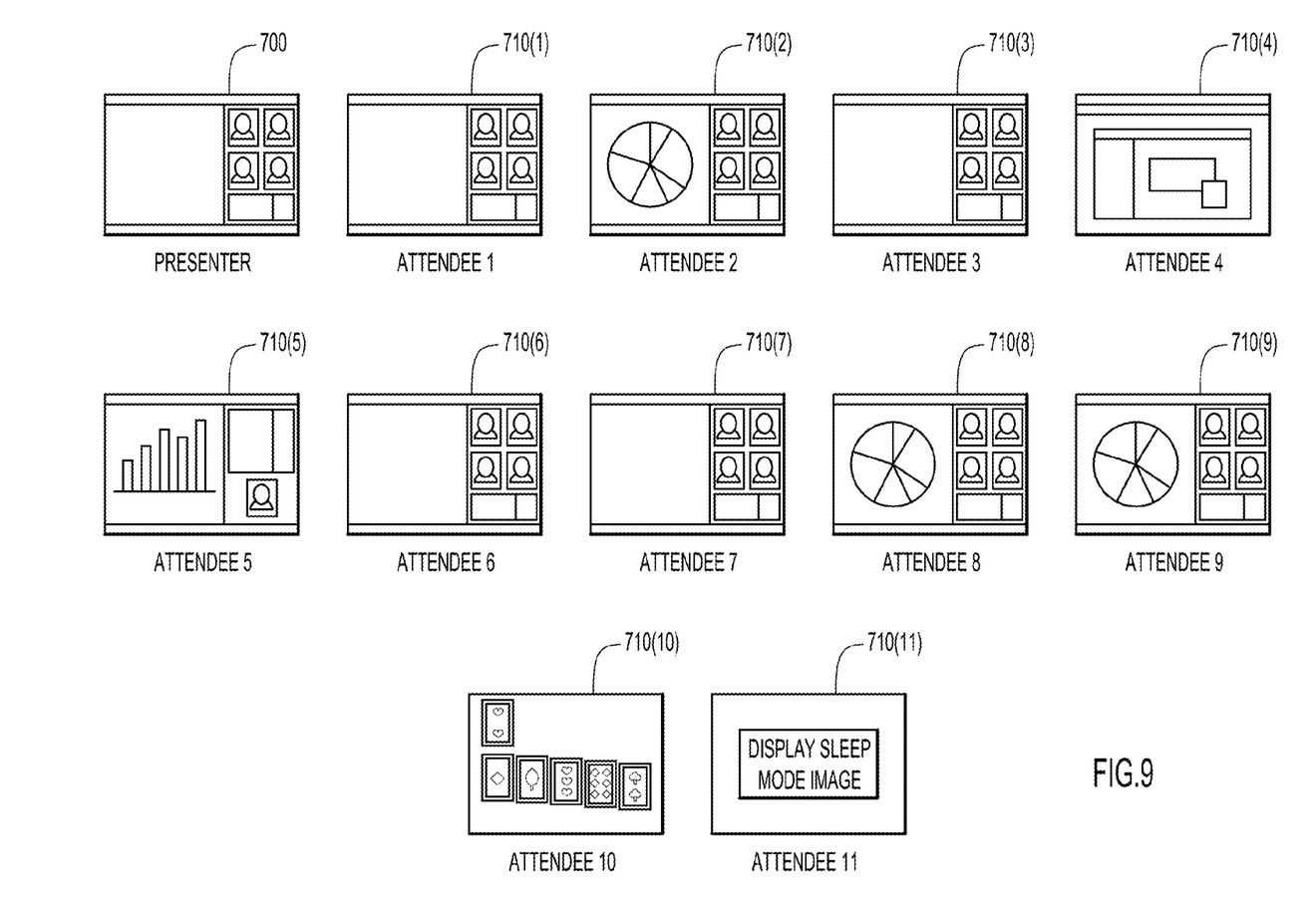
FIG. 9 is a diagram showing an example of screenshots captured at the presenter endpoint device and each attendee endpoint device at a particular screenshot capture instance.

At 330, the conference server stores first data representing screenshots of content displayed at the endpoints of the presenter and of content displayed at the endpoints of each of the attendees for each screenshot capture instance (operation 310). The first data thus represents an overview of the attention of all attendees at individual screenshot capture instances. Examples of screenshots captured at a particular screenshot instance from the presenter and all of the attendees are shown in FIG. 9, described in detail hereinafter. The conference server 20 may send data representing this view of the screenshots of the presenter and all attendees at a particular time instance to the endpoint of the presenter, even during the conference session, either upon request from the presenter or autonomously to the presenter on a periodic basis.

Figure 10:
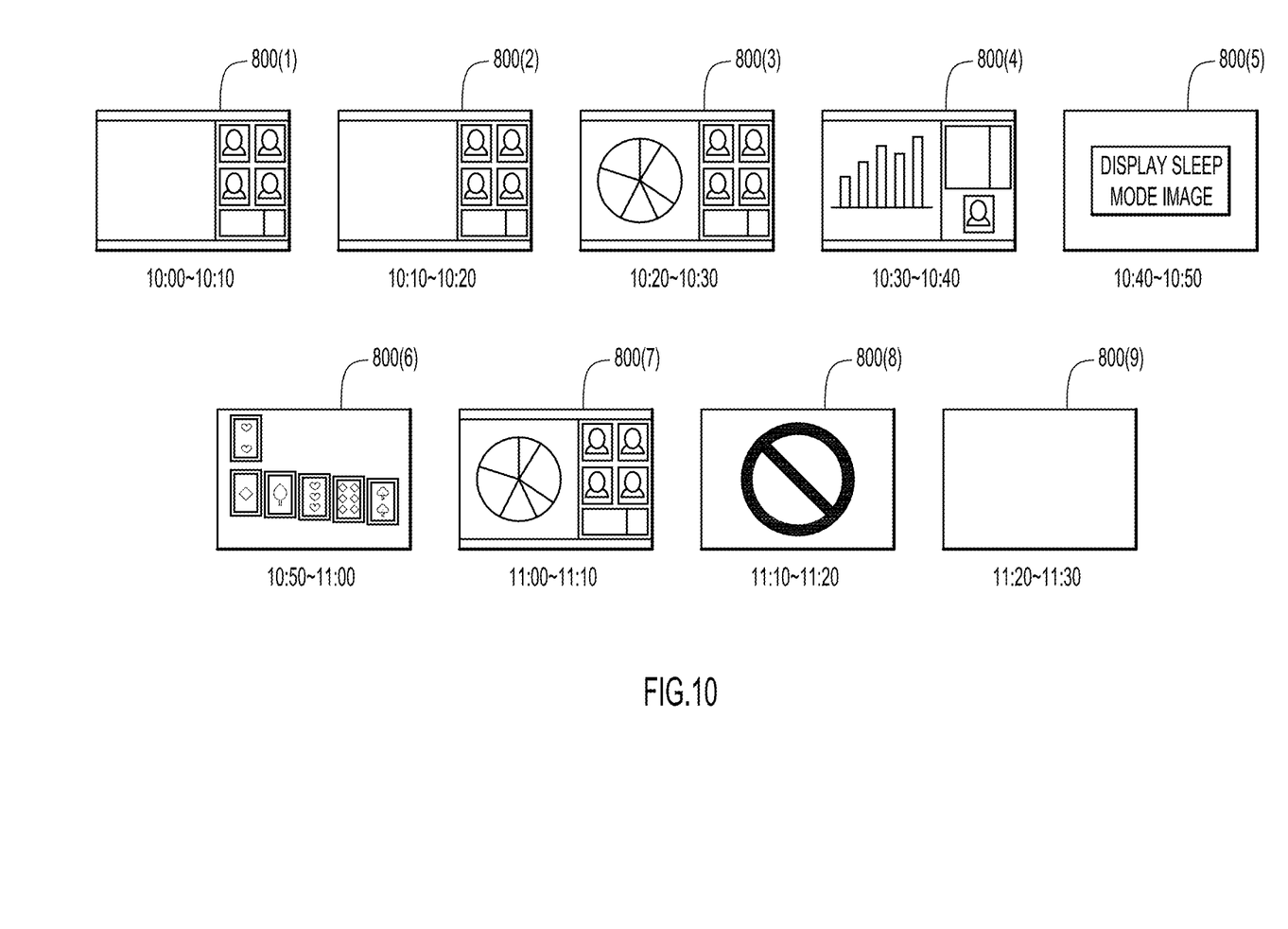
FIG. 10 is a diagram showing an example of screenshots captured at a particular attendee endpoint device at each of a plurality of screenshot capture instances during an online conference session.

In addition, at 340, the conference server 20 stores second data representing captured screenshots at each of a plurality of screenshot capture instances at the endpoint device for each attendee during the conference session. Thus, operation 340 involves storing data for multiple screenshot capture instances for individual endpoints in order to build up a history of screenshot captures for each endpoint. This second data will represent a particular attendee's attention history during a conference session. Examples of screenshots captured during the entire conference session for a particular attendee are shown in FIG. 10, described hereinafter. The conference server 20 may send the screenshot captures for a particular attendee during the entire conference session (at the periodic screenshot capture instances) to the presenter, even during the conference session, either upon request from the presenter or autonomously.

At 350, for a given screenshot capture instance, the conference server 20 compares content displayed at the endpoint of the presenter with content displayed at the endpoints of each of the attendees. If the content displayed on a particular attendee endpoint is different from the content displayed on the presenter endpoint at a particular screenshot capture instance, this may indicate that the attendee of that particular endpoint is not paying attention to the presentation being made by the presenter.

At 360, for each attendee, the conference server 20 compares content displayed at each of the plurality of screenshot capture instances with content displayed at the endpoint of the presenter at each of the plurality of screenshot capture instances. In this way, the conference server 20 can determine, for an individual attendee, how often, during a conference session, the attendee is paying attention to the presenter's presentation over the duration of the conference session.

At 370, the conference server 20 generates an attention metric for one or more attendees based on the comparing operations at 350 and 360, and also optionally also based on the recording of processes and applications determined to be occurring at the endpoints of the attendees at 320. The attention metric may be a ratio or percentage, e.g., 70%, 20%, etc., based on the number of instances of disparity between the presenter's screenshot content and the attendee's screenshot content, as well as based on the number of processes and applications running on the attendee's endpoint that are not related to or used by the conference session ongoing with the presenter. In addition, the conference server 20 may compare an attendee's attention metric with a threshold, e.g., 50%, 60% or some other configurable percentage, and generate an alert that is sent to the presenter when an attendee's attention metric drops below that threshold. There are numerous computations now known or that may be hereinafter developed to make the actual computation of the attention ratio or metric, and those details are therefore not described herein.

The first data, second data, and data representing currently running applications and processes on attendee devices can be stored in database form in memory 26 of the conference server 20 (FIG. 2).

In another form or variation of the flow chart shown in FIG. 4, the first data and second data are stored at the conference server, and sent by the conference server 20 to the endpoint device 30 of the presenter for display to the presenter.

The operations shown in the flow chart depicted in FIG. 4 may be summarized in another way, as follows. In an online conference session involving a presenter at an endpoint device and a plurality of attendees at respective endpoint devices, on a periodic basis screenshots of content displayed at the endpoint device of the presenter and content displayed at the endpoint devices of each of the attendees are captured. First data is stored representing screenshots of content displayed at the endpoint device of the presenter and of content displayed at the endpoint devices of each of the attendees for each screenshot capture instance. Second data is stored representing captured screenshots at each of a plurality of screenshot capture instances at the endpoint device for each attendee during the conference session. The first data is sent to the endpoint device of the presenter for display at the endpoint device of the presenter (during or after the conference session). The second data is sent to the endpoint device of the presenter for display at the endpoint device of the presenter (during or after the conference session). For a given screenshot capture instance, a first comparing operation is performed between content displayed at the endpoint device of the presenter and content displayed at the endpoint devices of each of the attendees. For each attendee, a second comparing operation is performed between content displayed at each of the plurality of screenshot capture instances and content displayed at the endpoint device of the presenter. An attention metric is generated for one or more attendees based on the first and second comparing operations.

Figure 5:
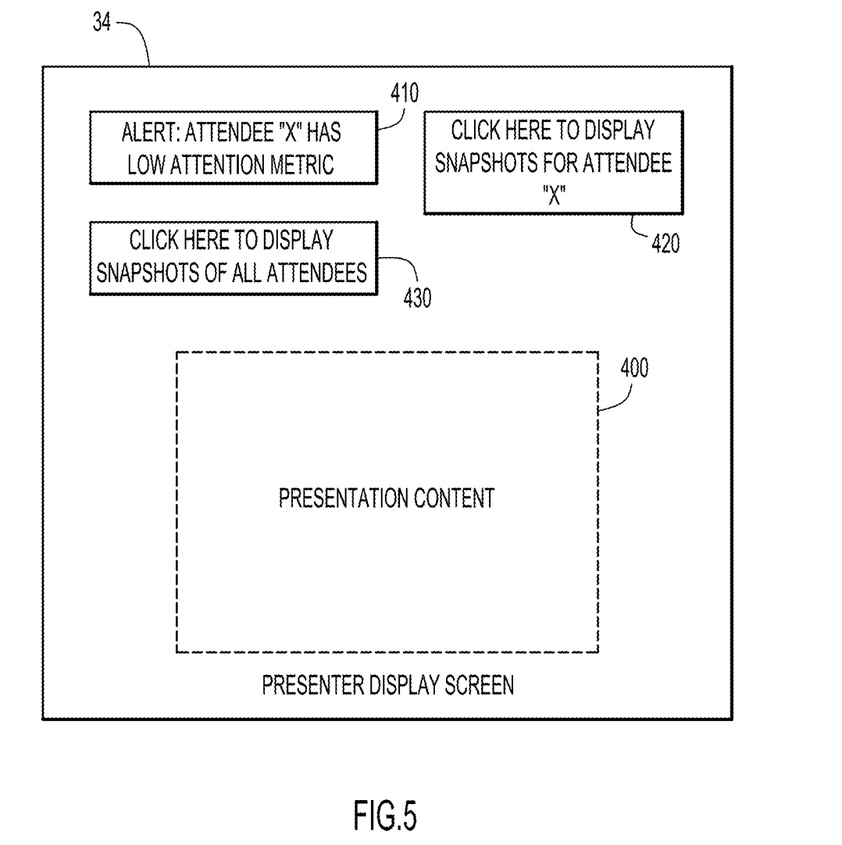
FIG. 5 is a diagram showing an example of a display screen of an endpoint device of a presenter and also illustrating examples of an alert message and control buttons displayed to a presenter.

Reference is now made to FIG. 5, which shows an example of the alerts and controls displayed to a presenter at the presenter's endpoint. On the display screen 34 of the presenter, there is a presentation content window 400 that contains the content that the presenter is sharing with the attendees. There may be documents, images, videos, real-time video of the presenter as well as one or more attendees, and other information displayed in the presentation content window 400. When the conference server 20 determines that the attention metric for one or more attendee drops below a threshold, the conference server 20 may send an alert to the presenter, as described above, and this alert may be displayed as a graphical element on the presenter's screen, shown at reference numeral 410. The presenter may then decide to request more information for that attendee or for all of the attendees. For example, a graphical element may be displayed on the presenter's screen to allow the presenter to request from the conference server 20 more detailed information about the attendee's attention history and activity during the conference session. Button 420 is an example of a button that, when selected or clicked by the presenter, will send a request to the conference server 20 to send back to the presenter endpoint more detailed screenshot information for the particular attendee who was reported to the presenter as being below an attention metric threshold. Button 430 is an example of a button that, when selected by the presenter, will send a request to the conference server 20 to send back to the presenter endpoint an overview of the captured screenshots at the endpoints of all of the attendees.

Figure 6:
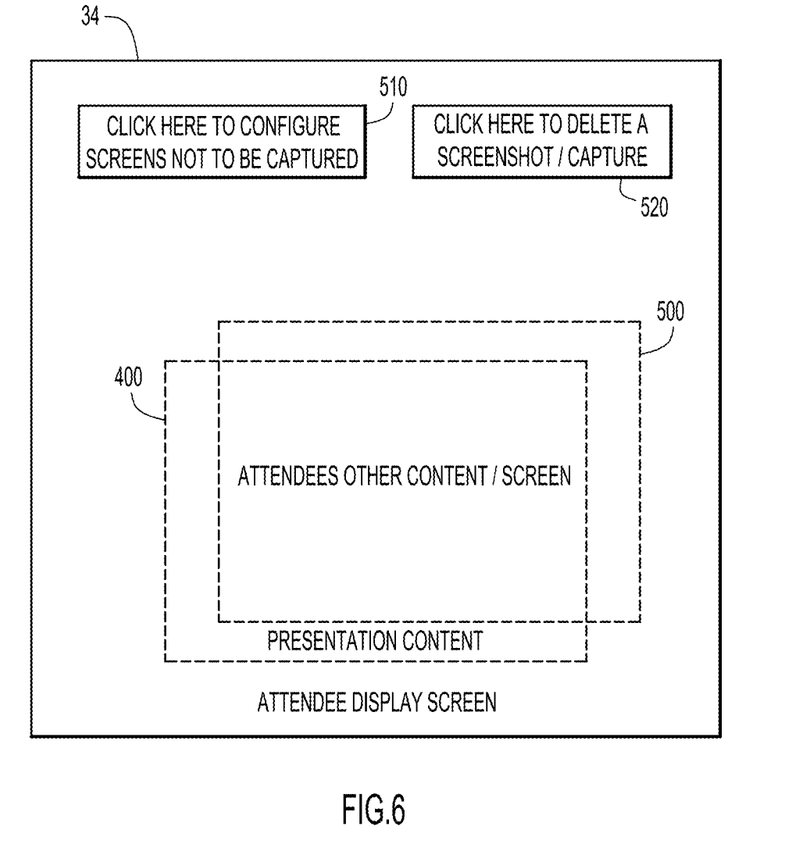
FIG. 6 is a diagram showing an example of a display screen of an endpoint device of an attendee and illustrating examples of control buttons to allow an attendee to configure the disablement of certain screenshot captures or deletion of screenshot captures.

Turning now to FIG. 6, a diagram is shown of example display screen content on an attendee endpoint. The presenter's presentation content window is shown at 400, and this is the same as the presenter's presentation content window 400 shown in FIG. 5. The presentation content window 400 is what the attendee should be focusing on during the conference session. Window 500 is an example of a window of content other than the presentation content window 400, and may result from one or more other applications that the attendee has open and is using on his endpoint during the conference session, such as an email application, Internet browser application, etc. FIG. 6 shows that at any time, the attendee may have the window 500 on top of and thus fully or partially hiding window 400, indicating that the attendee is not focusing on the presentation by the presenter during the conference session.

Also shown in FIG. 6 are buttons that allow the attendee to make certain configurations with respect to screenshot captures at the attendee's endpoint. Button 510 is provided to allow an attendee to configure the conference session plug-in software not to capture screenshots when the attendee has certain applications and windows active, such as applications that contain private information, e.g., email applications, bank account or other financial applications, instant messaging applications, employee information, etc. The attendee can configure the conference session plug-in software not to capture screenshots when certain applications are active so that those screenshots images are not sent to the conference server 20, thereby protecting private or other information from viewing by the presenter. Button 520 is provided to allow the attendee to configure the conference session plug-in software to delete certain screenshot captures made during the conference session. The attendee may select this button to make this "delete" mode active for a period of time during which any screenshot captures that are made are deleted (regardless of what is currently displayed on the attendee's endpoint), and then select the button again to disable the "delete" mode and thereby allow for screenshot captures to be sent to the conference server.

Figure 7:
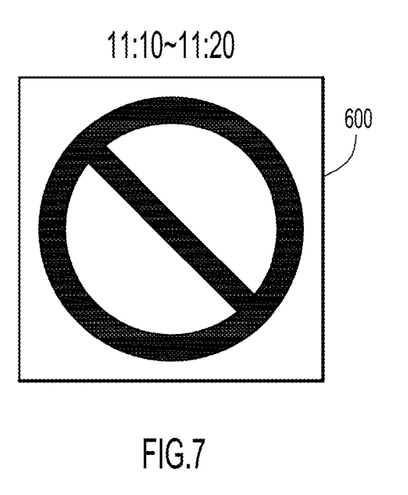
FIG. 7 is a diagram showing an example of an image of a screenshot that has been disabled for capture at an attendee endpoint device.
Figure 8:
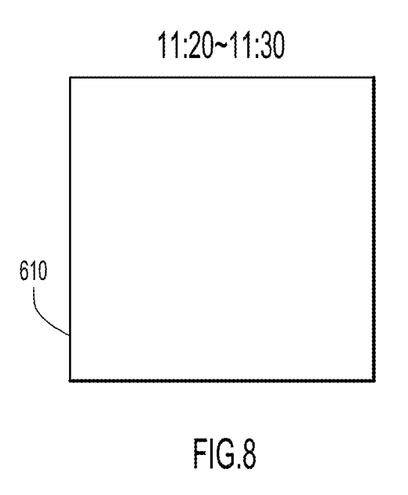
FIG. 8 is a diagram showing an example of an image of a screenshot that has been deleted at an attendee endpoint device.

FIGS. 7 and 8 show examples of screenshot images that are used by the conference server when an attendee configures his/her endpoint to disable capturing of certain screenshots or to disable capturing of any screenshots. FIG. 7 shows a generic screenshot image 600 that is created when an attendee configures certain displays screens to be kept private, e.g., email application windows, financial application windows, etc., as described above in connection with FIG. 6. The attendee defines, through a configuration screen on the endpoint, which applications are to be kept private and for which screenshot captures should not be made. Thus, when a screenshot capture instance occurs, and one of the applications that the attendee configures to be kept private is active and displaying to the attendee on his/her endpoint, the conference session plug-in software will not capture that displayed information, and instead will cause a generic screen image, such as that shown in FIG. 7, to be stored at the conference server 20 for the endpoint for that attendee, thereby not revealing any information for that attendee's application. When a screenshot is not captured for an attendee endpoint, the conference server 20 treats that attendee as not being on attention for that screenshot capture instance, and this is factored into the computation of that attendee's attention metric or ratio accordingly.

FIG. 8 shows a screenshot image associated with an attendee configuring his/her endpoint to delete screenshot captures altogether, as described above in connection with FIG. 6. This would occur when the attendee wishes to delete screenshot captures regardless of what applications are currently being used and displayed on the attendee's endpoint. In other words, what is being displayed on the attendee's screen is not in the list of configured screens that are not to be captured (according to FIG. 7). The attendee may want to disable a currently displayed screen from being captured, or to disable screenshot capturing for a period of time. In this case, a blank screen image 610 is used to represent a screenshot capture instance for an attendee that desires deletion of screenshot captures entirely at the time a screenshot capture instance occurs. When a screenshot for an attendee endpoint is deleted at the time of a screenshot capture instance, the conference server 20 treats that attendee as not being on attention for that screenshot capture instance, and this is factored into the computation of that attendee's attention metric or ratio accordingly.

Reference is now made to FIG. 9, which shows an example of an overview of screenshots for the presenter and all attendees at one screenshot capture instance, i.e., one time frame. Data to display the view such as that shown in FIG. 9 may be sent by the conference server 20 to the presenter endpoint, either at the request of the presenter, automatically, or when one or more attendee's are determined to have a low attention metric. Screenshot 700 is for the presenter. Screenshot 710(1)-710(11) are for Attendees 1-11. In the example of FIG. 9, the conference server 20 (and the presenter from viewing this data) can determine that attendees 4, 10 and 11 are not on attention. Attendees 2, 5, 8 and 9 are not displaying the same content as the presenter at this time instance, but it is possible this is due to a network connection speed issue, and that they are displaying content that was previously presented by the Presenter and it is evident that these screenshot captures contain the graphical elements of the conference session, but just delayed in time. If the current top windows title and task name are the same as the presenter's, then attendees 2, 5, 8 and 9 may be determined to be on attention. Attendees 10 and 11, on the other hand, would be determined to clearly not be on attention because their screens are entirely different from the Presenter's. Attendee 10 is playing a card game and the display screen of Attendee 11 is blank or is displaying some other image that indicates a sleep mode of the endpoint for Attendee 11.

Turning now to FIG. 10, examples of screenshots are shown for one particular attendee, captured at periodic screenshot capture instances, over the duration of the conference session, e.g., every 10 minutes. This is an example of the type of attendee-specific overview that may be presented to a presenter during or after a conference session. In this example, there are 9 screenshots 800(1)-800(9) captured over the entire conference session that went from 10:00 to 11:30. From this view, it is readily apparent that at the time intervals 10:40-10:50, 10:50-11:00, 11:10-11:20 and 11:20-11:30, this particular attendee is not on attention. From 10:40-10:50, this attendee's display screen is in sleep mode. From 10:50-11:00, this attendee is playing a card game. From 11:10-11:20, this attendee is engaged in private activities and has disabled screenshot captures for those particular private activities. From 11:20-11:30, this attendee has intentionally deleted screenshot capturing.

Figure 11:
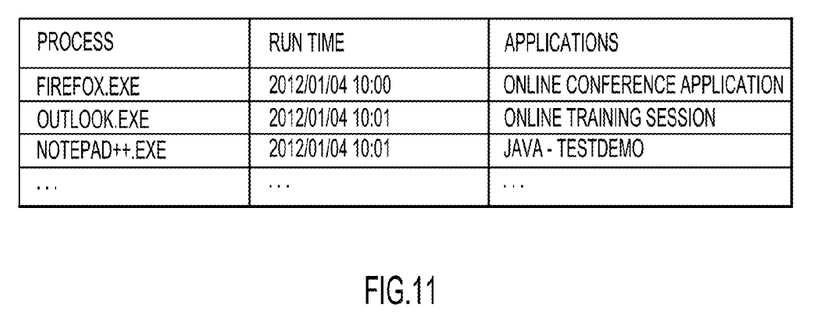
FIG. 11 is a diagram showing an example of data recorded for processes and applications running on a particular attendee endpoint device during an online conference session.

Turning now to FIG. 11, a diagram is shown for examples of data recorded at the conference server for all processes and applications running on an endpoint device of a particular attendee during a conference session. This example shows that records are captured and stored every minute for the applications and processes running on an attendee's endpoint. This information is also useful in determining, together with the screenshot data, whether an attendee is on attention, as explained above in connection with FIG. 4.

In some applications it may be desirable to stream live or real-time video of the attendees screen content or of the attendees themselves to the presenter so that the presenter can see for himself/herself in real-time what an attendee doing during the presentation. Since the continuous streaming of live or real-time video for one or more attendees to the presenter would be bandwidth intensive, the real-time streaming may be useful after it has been determined that one or more attendees are not paying attention to the presentation based on the analysis techniques described herein.

In summary, the interactive attention monitoring techniques described herein involve capturing both presenter (online training host, e.g., a teacher) and online training attendees (e.g., students) screenshots periodically (e.g., every 5 or 10 minutes or some other configurable period), and to automatically randomly trigger or select the actual screenshot capture instance at the periodic capture event so that an attendee or presenter could not know or guess when the screenshot capture will occur. The captured screenshots may be managed in a minimal less detailed view and in a more detailed view. Moreover, screenshots can be captured, analyzed and viewed for the entirety of a conference session for a given attendee. Each attendee can define which screenshots are to be considered private and thus not captured, and also can delete screenshots (without regard to the screenshot content). Screenshots which are not captured because they fall within an attendee's definition of private or which were deleted by an attendee (regardless of whether they were designated as private) are considered, on behalf of that attendee, as being an attendee not on attention.

The above description is intended by way of example only.

What is claimed is:

1. A method comprising:
   in an online conference session involving a presenter at an endpoint device and a plurality of attendees at respective endpoint devices, on a periodic basis capturing screenshots of content displayed at the endpoint device of the presenter and content displayed at the endpoint devices of each of the attendees;
   storing first data representing screenshots of content displayed at the endpoint device of the presenter and of content displayed at the endpoint devices of each of the attendees for each screenshot capture instance;
   for a given screenshot capture instance, first comparing content displayed at the endpoint device of the presenter with content displayed at the endpoint devices of each of the attendees;
   storing second data representing captured screenshots at each of a plurality of screenshot capture instances at the endpoint device for each attendee during the conference session;
   for each attendee, second comparing content displayed at each of the plurality of screenshot capture instances with content displayed at the endpoint device of the presenter; and
   generating an attention metric for one or more attendees based on the first comparing and second comparing.

2. The method of claim 1, and further comprising sending data representing an attention metric for one or more attendees to the endpoint device of the presenter.

3. The method of claim 2, and further comprising sending the first data to the endpoint device of the presenter for display at the endpoint device of the presenter during the conference session.

4. The method of claim 2, and further comprising sending the second data to the endpoint device of the presenter for display at the endpoint device of the presenter during the conference session.

5. The method of claim 1, wherein capturing comprises capturing screenshots at a random instant of time at each screenshot capture instance.

6. The method of claim 1, and further comprising recording information representing processes and applications running on attendee endpoint devices during the conference session, and wherein first comparing and second comparing include comparing a title of a current top window at the endpoint device of the presenter with titles of current top windows at the endpoint devices of each of the attendees.

7. The method of claim 6, further comprising comparing a task name at the endpoint device of the presenter with task names of at the endpoint devices of each of the attendees.

8. The method of claim 1, further comprising, at the endpoint device of one or more attendees, disabling capture of screenshots for one or more types of screenshot content.

9. The method of claim 8, wherein first comparing and second comparing are performed so as to treat disabled screenshot capture instances at the endpoint device of an attendee as if the attendee is not on attention.

10. The method of claim 1, and further comprising, at the endpoint device of one or more attendees, deleting content of a screenshot capture instance.

11. The method of claim 1, and further comprising storing data to record all processes and applications running at the endpoint devices for one or more attendees during the conference session, and wherein generating the attention metric is based further on the processes and applications running at the endpoint devices for each attendee during the conference session.

12. The method of claim 1, wherein storing first data, first comparing, storing second data, second comparing and generating are performed at a conference server that is in communication with the endpoint device of the presenter and endpoint devices of each of the attendees.

13. An apparatus comprising:
    a network interface unit configured to enable communications over a network to communicate with an endpoint device of a presenter and endpoint devices of a plurality of attendees that are participating in an online conference session;
    a memory;
    at least one processor coupled to the network interface and the memory, the processor configured to:
      on a periodic basis, capture screenshots of content displayed at the endpoint device of the presenter and content displayed at the endpoint devices of each of the attendees;
      store first data representing screenshots of content displayed at the endpoint device of the presenter and of content displayed at the endpoint devices of each of the attendees for each screenshot capture instance;
      for a given screenshot capture instance, first compare content displayed at the endpoint device of the presenter with content displayed at the endpoint devices of each of the attendees;
      store second data representing captured screenshots at each of a plurality of screenshot capture instances at the endpoint device for each attendee during the conference session;
      for each attendee, second compare content displayed at each of the plurality of screenshot capture instances with content displayed at the endpoint device of the presenter; and
      generate an attention metric for one or more attendees based on the first comparing and second comparing.

14. The apparatus of claim 13, wherein the processor is further configured to send data representing an attention metric for one or more attendees to the endpoint device of the presenter.

15. The apparatus of claim 13, wherein the processor is further configured to cause screenshots to be captured at a random instant of time at each screenshot capture instance.

16. The apparatus of claim 13, wherein the processor is configured to perform the first compare and second compare operations so as to treat disabled screenshot capture instances at an endpoint device of an attendee as if the attendee is not on attention.

17. The apparatus of claim 13, wherein the processor is configured to perform the first compare and second compare operations so as to treat deleted screenshot capture instances at an endpoint device of an attendee as if the attendee is not on attention.

18. The apparatus of claim 13, wherein the processor is configured to store data to record all processes and applications running at the endpoint devices for one or more attendees during the conference session, and to generate the attention metric based further on the processes and applications determined to be running at the endpoint devices for each attendee during the conference session.

19. The apparatus of claim 13, wherein the processor is further configured to send at least one of the first data and second data to the endpoint device of the presenter.

20. One or more non-transitory computer readable storage media encoded with software comprising computer executable instructions and when the software is executed operable to:
- on a periodic basis, cause the capture screenshots of content displayed at an endpoint device of a presenter and content displayed at endpoint devices of each of the attendees participating in an online conference session;
- store first data representing screenshots of content displayed at the endpoint device of the presenter and of content displayed at the endpoint devices of each of the attendees for each screenshot capture instance;
- for a given screenshot capture instance, first compare content displayed at the endpoint device of the presenter with content displayed at the endpoint devices of each of the attendees;
- store second data representing captured screenshots at each of a plurality of screenshot capture instances at the endpoint device for each attendee during the conference session;
- for each attendee, second compare content displayed at each of the plurality of screenshot capture instances with content displayed at the endpoint device of the presenter; and
- generate an attention metric for one or more attendees based on the first comparing and second comparing.

21. The computer readable storage media of claim 20, and further comprising instructions operable to send data representing an attention metric for one or more attendees to the endpoint device of the presenter.

22. The computer readable storage media of claim 20, and further comprising instructions operable to cause screenshots to be captured at a random instant of time at each screenshot capture instance.

23. The computer readable storage media of claim 20, and further comprising instructions operable to send at least one of the first data and second data to the endpoint device of the presenter.

24. The computer readable storage media of claim 20, and further comprising instructions operable to store data to record all processes and applications running at the endpoint devices for one or more attendees during the conference session, and to generate the attention metric based further on the processes and applications determined to be running at the endpoint devices for each attendee during the conference session.

25. The computer readable storage media of claim 20, and further comprising instructions operable to perform the first compare and second compare operations so as to treat deleted or disabled screenshot capture instances at an endpoint device of an attendee as if the attendee is not on attention.

26. A method comprising:
- in an online conference session involving a presenter at an endpoint device and a plurality of attendees at respective endpoint devices, on a periodic basis capturing screenshots of content displayed at the endpoint device of the presenter and content displayed at the endpoint devices of each of the attendees;
- storing first data representing screenshots of content displayed at the endpoint device of the presenter and of content displayed at the endpoint devices of each of the attendees for each screenshot capture instance;
- storing second data representing captured screenshots at each of a plurality of screenshot capture instances at the endpoint device for each attendee during the conference session;
- sending the first data to the endpoint device of the presenter for display at the endpoint device of the presenter; and
- sending the second data to the endpoint device of the presenter for display at the endpoint device of the presenter.

27. The method of claim 26, and further comprising:
- for a given screenshot capture instance, first comparing content displayed at the endpoint device of the presenter with content displayed at the endpoint devices of each of the attendees;
- for each attendee, second comparing content displayed at each of the plurality of screenshot capture instances with content displayed at the endpoint device of the presenter; and
- generating an attention metric for one or more attendees based on the first comparing and second comparing.

28. The method of claim 27, and further comprising sending data representing an attention metric for one or more attendees to the endpoint device of the presenter.

* * * * *